United States Patent [19]

Kent et al.

[11] 4,202,604

[45] May 13, 1980

[54] DECORATIVE OPTICAL DEVICE

[76] Inventors: Lenore S. Kent, 28057 S. Harwich Dr., Farmington Hills, Mich. 48018; John D. Straub, 20030 Tireman, Detroit, Mich. 48228

[21] Appl. No.: 830,431

[22] Filed: Sep. 6, 1977

[51] Int. Cl.[2] .......... G02B 5/08

[52] U.S. Cl. .......... 350/291; 40/219

[58] Field of Search .......... 350/291; 40/219; 272/8 M, 8.5

[56] References Cited

U.S. PATENT DOCUMENTS

| | | | |
|---|---|---|---|
| 2,042,268 | 5/1936 | Michaus | 272/8 M UX |
| 2,132,473 | 10/1938 | En Holm | 272/8 M UX |
| 2,698,177 | 12/1954 | Engman | 350/291 X |

*Primary Examiner*—F. L. Evans

*Attorney, Agent, or Firm*—Basile and Weintraub

[57] ABSTRACT

An optical device, adapted to give varying "depth of field" effects. The device hereof utilizes first and second reflective surfaces, at least one of which is movable with respect to the other. A light source is interposed between the two reflective surfaces.

6 Claims, 4 Drawing Figures

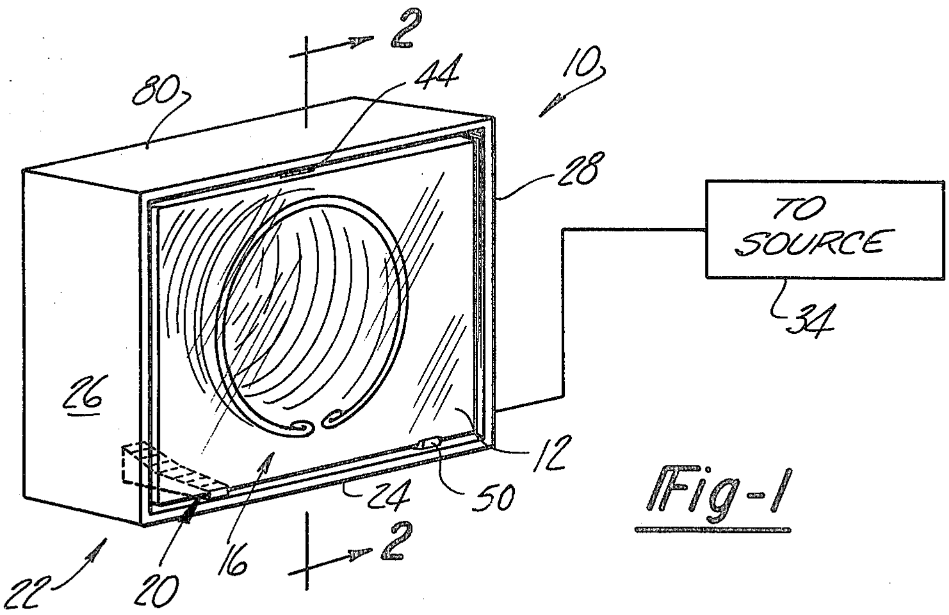
Fig-1
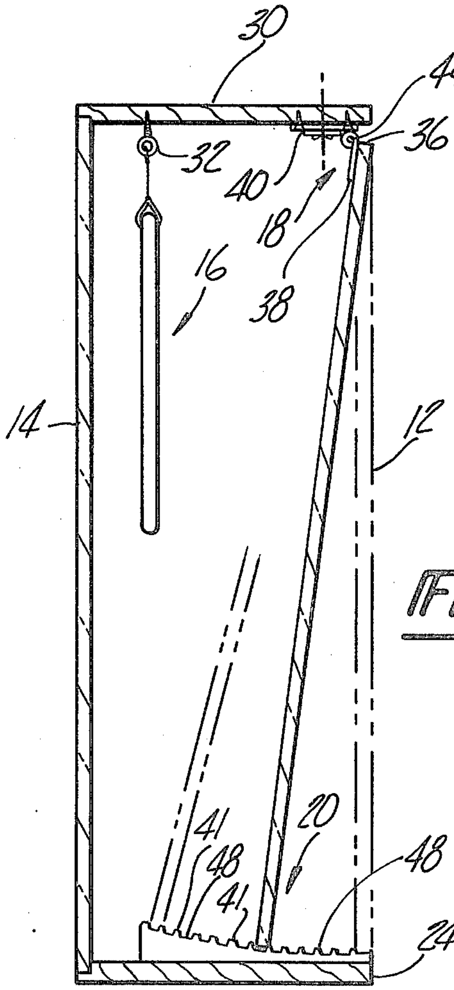
Fig-2
Fig-3
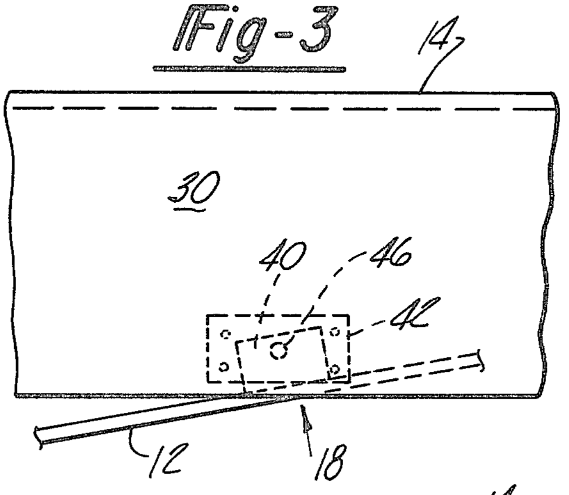
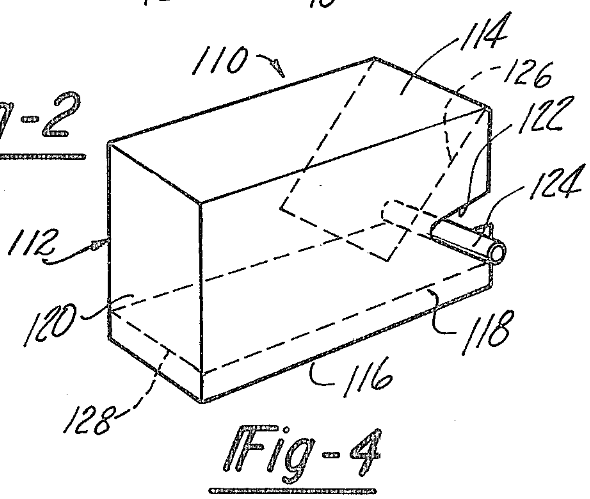
Fig-4

DECORATIVE OPTICAL DEVICE

BACKGROUND OF THE INVENTION

1. Field of the Invention

The present invention pertains to display devices. More particularly, the present invention pertains to optical display devices. Even more particularly, the present invention pertains to decorative optical display devices.

2. Prior Art

Presently within the field of home and office decorative furnishings there has been increasing atttention paid to reflective surfaces, such as mirrors. Furthermore, an increasing awareness of optical and light effects has become apparent. The combination of these efforts has seen an increasing growth in aluminated visual display devices.

It has come to the attention of applicants that there presently exists an illuminated visual display device having first and second reflective surfaces with a light source disposed therebetween. Observation of this device from varying angles results in the views seeing various "depth of field" arrays. However, in order to achieve these varying arrays, it is necessary for the viewer to move about the device.

The present invention, as will subsequently be detailed, renders such devices more sophisticated by providing the varying arrays as a result of the function of the device, per se, and not the movement of the viewer.

SUMMARY OF THE INVENTION

In accordance with the present invention, there is provided an illuminated visual or optical display device which comprises first and second, spaced apart reflective surfaces. Interposed between the reflective surfaces is an illumination means. The present invention further comprises means for universally moving at least one of the reflective surfaces.

In practicing the present invention one of the reflective surfaces is, preferably, a single-way mirror. The other reflective surface is a two-way mirror.

The illumination means can comprise any suitable light source of any desired type, such as neon gas-filled tubes with varying colors; filament-type bulbs or the like.

The means for moving at least one of the reflective surfaces comprises a hinged means secured to a housing onto which the reflective surfaces are mounted. The hinge permits rotation of the reflective surface, associated therewith, about both horizontal and vertical axis. A tongue and groove assembly enables the movable reflective surface to be locked in any desired position.

In a preferred embodiment of the present invention the hinge means comprises the output shaft of a motor whereby the motion imparted to the reflective surface is achieved mechanically, rather than manually.

For a more complete understanding of the present invention, reference is made to the following detailed description and accompanying drawing. In the drawing, like reference characters refer to like parts throughout the several views in which:

BRIEF DESCRIPTION OF THE DRAWING

FIG. 1 is a perspective view of an illuminated visual display device in accordance with the present invention;

FIG. 2 is a cross sectional view taken along the line 2—2 of FIG. 1;

FIG. 3 is a top plan view, partly in phantom, of the display device hereof particularly denoting the means for universally rotating at least one of the reflective surfaces, and FIG. 4 is a broken, perspective view of an alternate embodiment of the present invention.

DESCRIPTION OF THE PREFERRED EMBODIMENTS

Now, and with reference to the drawing, there is depicted therein an illuminable visual display device, generally, denoted at 10.

The device hereof comprises a first reflective surface 12, a second reflective surface 14 and illumination means 16. The present invention further comprises means 18 for universally rotating at least one of the reflective surfaces 12 or 14. The present invention, also, contemplates the inclusion of means 20 for holding or walking the movable surface in a fixed position.

More particularly, the present invention ncludes a housing 22. The housing 22 is defined by a base 24, a pair of opposed, upstanding sidewalls 26, 28 and a top wall 30. The base, sidewalls and top wall cooperate to define a substantially open rectangular configuration.

In practicing the present invention the housing is configured to the geometric configuration of the reflective surfaces utilized.

The reflective surfaces 12, 14 are mounted to the housing, and as heretofore noted, such that at least one of the reflective surfaces is universally rotatably mounted thereto. The reflective surfaces, in essence, define end walls for the housing. The illumination means 16 is disposed within the housing by any suitable means. For example, and as shown in the drawing, the illumination means comprises a tubular element, such as a neon tube or the like, which is suspended from the interior surface of the top wall 30 via an eye screw 32 or the like. Of course, a track or similar device could be installed within the interior of the housing and a plurality of light bulbs or the like could be threadably connected thereto. The illumination means 16 is in electrical communication with a suitable source, such as an AC outlet or the like 34. The electrical source is of any well known construction and generally includes a switching means to effectuate an on-off status for the illumination means.

As heretofore noted, the present invention contemplates the development of first and second reflective surfaces. In order to fully attain the visual effects accorded the present invention, it is preferred in the practice hereof that the reflective surfaces comprise mirrors. Furthermore, in order to achieve the desired results one of the mirrors comprises a "one way mirror." The other reflective surface is defined by a "two-way" mirror. This array of reflective surfaces achieves the "depth of field" effects heretofore related.

The means for rotating the reflective surface, generally, denoted at 18, comprises an intersecting axial arrangement or system. The means 18 comprises a hinge 36 which has a first leg 38 secured to the rear or inwardly disposed side or surface of the reflective surface associated therewith. A second leg 40 is secured to a bracket 42 which is secured to the interior surface of the top wall 30. The hinge has a central pin 44 about which the mirror or reflective surface rotates, again, in a well known manner.

The bracket 42, referred to above, defines an axial shaft or bearing 46 about which the leg 40 is secured.

Because of the mounting of the hinge to the bracket and the rotatable status thereof, the reflective surface associated with the mounting means enables the rotation of the reflective surface in both a vertical, as well as horizontal plane. The disposition of the hinge, per se, limits the horizontal rotation of the reflective surface associated therewith to being perpendicular to the base and top wall (FIG. 2).

Disposed within the housing 22 and affixed to the base 24 thereof, is the means for fixing the movable reflective surface in position, generally, denoted at 20. The means 20 comprises an upstanding member having a plurality of grooves 48 formed therein. The grooves 48 are formed transverse and substantially perpendicular to the longitudinal axis of the member. The grooves are closely spaced together. This permits slight incremental movement of the reflective surface associated therewith. Yet, by the practice of the present invention, slight movement accords great visual effect. The grooves are dimensioned to seat the bottom of the reflective surface therewithin. The depth of the groove inhibits movement of the reflective surface once it is seated therewithin. Also affixed to the movable reflective surface is a handle 50 or similar grasping member for facilitating movement. The means 20 is formed from a material which is sufficiently flexible to permit the reflective surface to pass over the walls 41 about the grooves 48.

In accordance with the present invention, the illumination means is rendered stationary and at least one of the reflective surfaces is rendered movable in the manner heretofore described. By moving the reflective surface in any desired manner varying visual effects are achieved.

Furthermore, and as contemplated by the present invention, the hinge and shaft can be mechanically and/or electrically actuated. The shaft 46 can comprise the output of a motor, as well as the hinge pin being likewise the mechanical output of a motor.

Referring now to FIG. 4, there is depicted therein an alternate embodiment of the present invention, generally, denoted at 110. According to this embodiment of the invention there is provided a housing 112 having top, bottom and opposed parallel spaced apart side walls (only one being shown) 114, 116 and 118, respectively. The front wall 120 comprises a reflective surface, and is, preferably, a single reflective surface.

Formed in each side wall 118 is a slot 122 extending from the rear wall of the housing toward the front wall 120. The slot extends about one-half the width of the associated side wall. The slot 122 defines a track for a handle 124 which slides along the lower edge of the slot. The handle 124 is fixedly secured to a second reflective surface 126 movably mounted within the housing. The surface 126 can comprise the rear wall of the device or can be disposed within the housing, the housing being provided with a separate rear wall. The surface 126 is hingedly connected to the top wall 114 in the manner heretofore described. Thus, the motion herein is imparted to the rear surface by movement of the handle(s) 124.

The housing 112 is, also, provided with an interior compartment 128 in which is stored any necessary transformers or the like.

It is to be appreciated that this embodiment of the invention eliminates the means 20, the slots 122 being utilized to effectuate the incremental movement of the reflective surface associated therewith.

Furthermore, it is comtemplated in accordance with the present invention that either, or both, of the reflective surfaces be movable either manually, electrically or mechanically. Furthermore, it is possible to render the illumination means movable for an even greater visual effect. All such modification would, of course, be within the scope of the present invention.

It has been found by the practice of the present invention that there is attained varying "depth of field" visual effects heretofore not attained by the presently known devices.

It is, of course, to be understood that other modifications and alterations can be made herewithin without departing from the scope and spirit of the present invention.

Having, thus, described the invention what is claimed is:

1. A visual display device comprising;
   (a) a first reflective surface, said first reflective surface being a one-way mirror,
   (b) a second reflective surface spaced from said first reflective surface, said second reflective surface being a two-way mirror;
   (c) an illumination means disposed between the first and second reflective surfaces, the illumination of the illumination means being reflected off of the reflective surfaces, and
   (d) means for incrementally rotating at least one of the reflective surfaces comprising;
      1. a hinge, connected to one of the first and second reflective surfaces, the one reflective surface associated therewith being movable in a horizontal plane thereabout,
      2. a vertically extending shaft interconnected to the hinge, the one reflective surface being rotatable in a vertical plane therearound, and
      3. a grooved upstanding member, the grooves being dimensioned to seat the bottom of the one reflective surface therewithin and to inhibit movement of the seated reflective surface.

2. The display device of claim 1 which further comprises:
   (a) a housing having at least a top wall,
   (b) a bracket connected to the top wall, and wherein the hinge has a first leg connected to the reflective surface and a second leg connected to the bracket, and
   the shaft is rotatably mounted onto the bracket and projects from the second leg.

3. The display device of claim 1 which further comprises:
   means for rotatably moving both reflective surfaces.

4. The display device of claim 1 which further comprises:
   means for grasping the reflecting surfaces to facilitate the rotation thereof.

5. The display device of claim 1 wherein:
   the illumination means comprises a colored neon light.

6. A visual display device comprising:

(a) a first reflective surface, said first reflective surface being a one-way mirror,
(b) a second reflective surface spaced from said first reflective surface, said second reflective surface being a two-way mirror,
(c) an illumination means disposed between the first and second reflective surfaces, the illumination of the illumination means being reflected off of the first and second reflective surfaces,
(d) a housing having at least a top wall, and
(e) means for incrementally rotating at least one of the reflective surfaces comprising:
1. a bracket connected to the top wall,
2. a hinge having first and second legs, the first leg connected to one of the first and second reflective surfaces and the second leg connected to the bracket such that the one reflective surface associated therewith is movable in a horizontal plane thereabout,
3. a vertically extending shaft rotatably mounted onto the bracket and projecting from the second leg of the hinge, the one reflective surface being rotatable in a vertical plane thereabout, and
4. a grooved upstanding member, the grooves being dimensioned to seat the bottom of the one reflective surface therewithin and to inhibit movement of the seated reflective surface.

* * * * *